Dec. 6, 1966           G. DOELTER           3,289,264
SLIDING CLASP CONTINUOUS FASTENERS
Filed Nov. 25, 1964           2 Sheets-Sheet 2
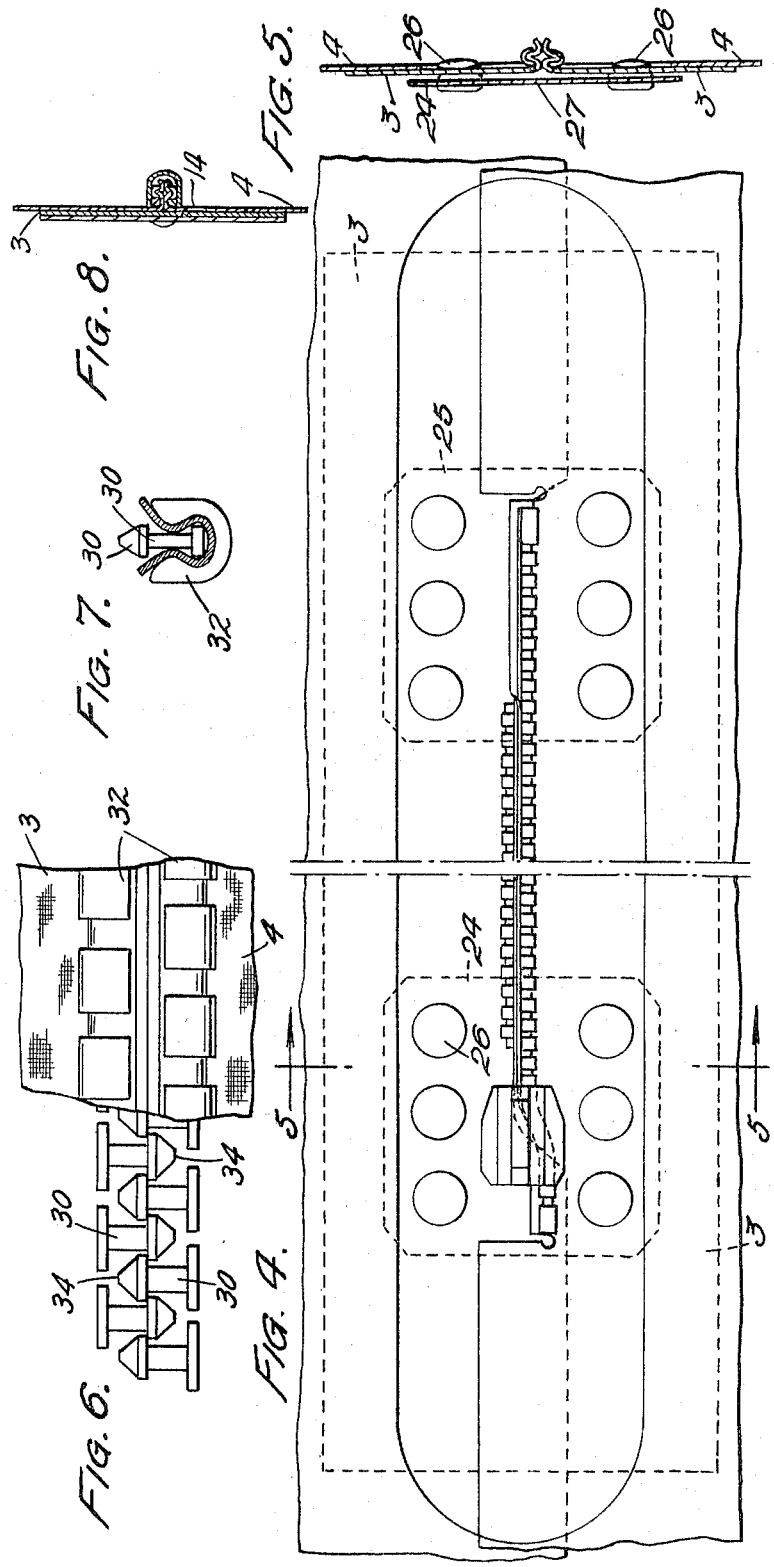
Inventor,
GANDOLPH DOELTER.
by Hall - Houghton
Attorney.

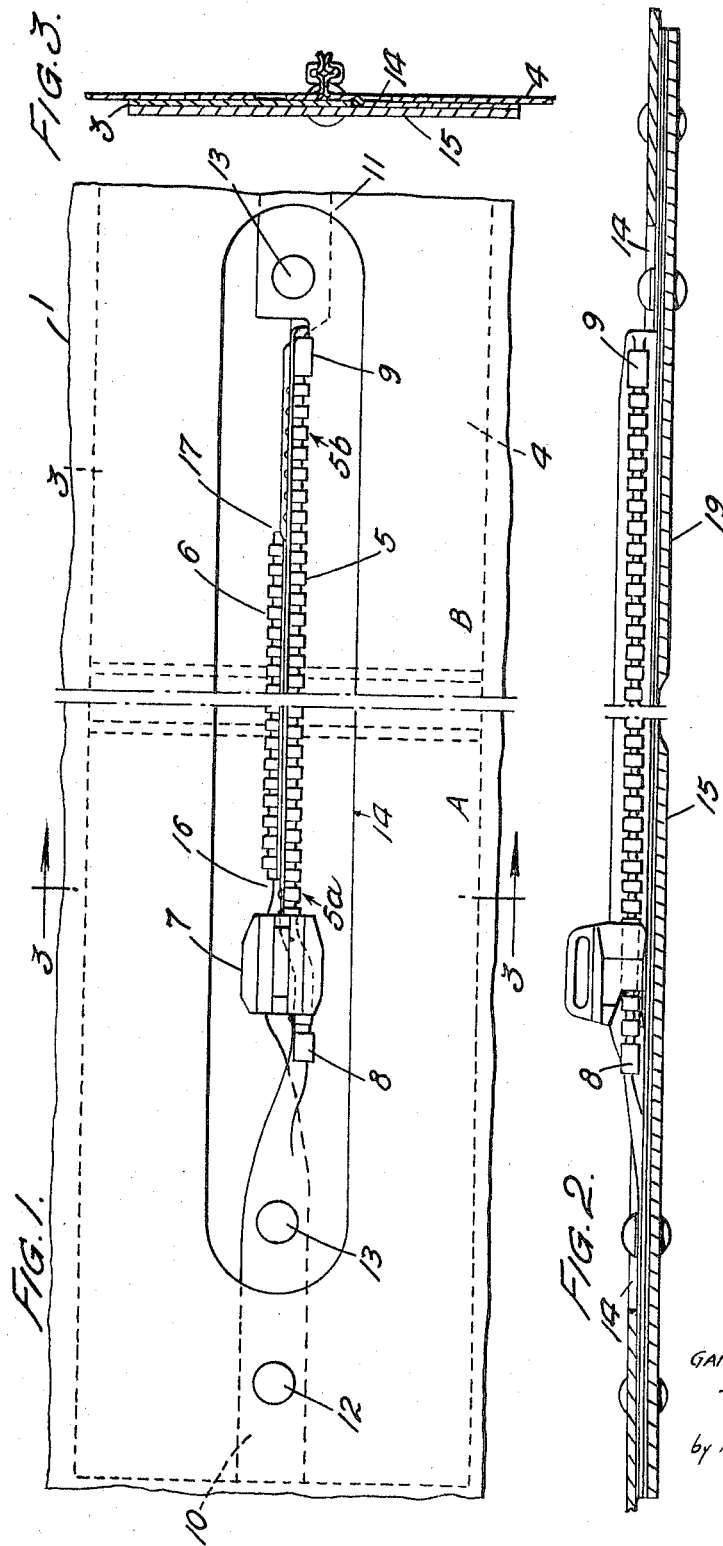

United States Patent Office 3,289,264
Patented Dec. 6, 1966

3,289,264
SLIDING CLASP CONTINUOUS FASTENERS
Gandolph Doelter, 96 Beaufort Mansions, Beaufort St., London, England
Filed Nov. 25, 1964, Ser. No. 413,867
Claims priority, application Great Britain, Feb. 3, 1964, 4,509/64
8 Claims. (Cl. 24—205.1)

The invention relates to sliding clasp continuous fasteners of the kind (herein referred to as the kind described) employed to join together edge portions of two tapes or sheets of flexible material (e.g. textile fabric) and which comprise, for each tape or sheet, either a row of fastener elements along the edge portion to be joined, each element having a head portion arranged to be engageable in holding relation between or behind the heads of a pair of elements in the opposite row, or a continuous fastener element constructed to engage lengthwise of the element in holding relation with a continuous element on the other tape or sheet, one or both of the elements being resilient to permit engagement or disengagement, in each case the engagement being effected by movement of a slider or clasp in one direction along the rows or elements, movement of the clasp in the opposite direction effecting disengagement.

The invention is especially, but not exclusively, concerned with the construction of fasteners of the above kind in which fastener elements are employed and in which each fastener element has a shank by which the element is secured to the flexible material with the head constituted by an enlargement at one end of the shank, the heads of each row of elements fitting between the shanks and engaging behind the heads of the elements of the other row when the fastener is closed and in which there is also, for each tape or sheet a row of outer elements which, in substance, are of U-shape and hold between their arms a fold of the flexible material around the other ends of the shanks of the fastener elements of that tape or sheet, there being, usually, one outer element for each fastener element. Fasteners of this construction are described, for example, in British patent specifications Nos. 723,998, 769,535, 769,536, 769,537 and 940,461, and such fasteners have the advantage that they are substantially fluid-tight when closed.

It is a characteristic of fasteners of the kind described that if a force is applied between the two pieces of flexible material tending to open the fastener, such opening readily occurs if the force is applied at an end of the rows and arrangements are usually made by which the ends are supported against such opening forces. For example the clasp is commonly employed to hold together the elements at the closed end (i.e. the end to which the clasp is moved in closing) and at the other end the two pieces of flexible material may be united and themselves support the fastener end against opening, or there may be an end stop which both holds the elements together and limits the travel of the clasp.

The present invention takes advantage of the opening properties of the ends of fasteners of the kind described, for example, to provide a fastener which will automatically open under a particular force which may, especially in the case of a fluid-tight fastener, be derived from fluid pressure within a container and the invention is concerned with consequential problems which arise.

In its broad aspect the invention provides a sliding clasp continuous fastener of the kind described in which at each end of the fastener one of the rows of fastener elements (or an equivalent rail) or one of continuous fastener elements has an extension beyond the other row or continuous element to receive the clasp free of the other row or continuous element.

With the fastener as just defined, the clasp when at the closed end may be parked on the extension whereby it no longer serves to support the rows or continuous elements against separation and, if separation occurs, the clasp may be slid along the row or continuous element having the extension on which it is parked on to the extension at the other or "open" end and then re-engaged with both rows or continuous elements for re-closing. As the "extensions" do not take part in the actual fastening it is not essential, although convenient, that they have fastener elements or be shaped for engagement with other elements. They may, for example, be rigid or flexible rods or rails on which the clasp can slide and be parked.

When the invention is applied to a closed end fastener, i.e. a fastener in which the two pieces of flexible material are permanently united at each end of the fastener, it is important that the construction permits the fastener at one, and preferably each, end to open. For example the flexible materials may be joined at the ends of the fastener by elastic sections or by pleated portions or by separable or rupturable means. If there is a seal as disclosed in British patent specification No. 879,771 this may be carried on an elastic base or support.

The invention may be applied, for example, to the closing of an inflatable air cushion designed to absorb impact shocks (e.g. on landing of parachuted or free falling supply containers) and to "burst" by opening of the fastener when a particular internal pressure is reached, thereby releasing the air. It may also be provided as an emergency or safety valve to release, rapidly, excessive pressures which may occur in other vessels or compartments. It is an advantage of the invention that the fastener can be re-closed and re-used.

Two specific embodiments of fasteners according to the invention will now be described by way of example and with reference to the accompanying drawings in which:

FIGURE 1 shows one of the fasteners in place in an air cushion, the latter being shown only incompletely,
FIGURE 2 is a side view of the fastener,
FIGURE 3 is a section on the line 3—3 in FIGURE 1,
FIGURE 4 is a view, corresponding to FIGURE 1 of the second fastener,
FIGURE 5 is a section on the line 5—5 in FIGURE 4,
FIGURE 6 is a detailed plan view of several fastener elements aligned with fabric tapes,
FIGURE 7 is a sectional view of a fastener element installed in a tape, and
FIGURE 8 is a view corresponding to FIGURE 3 showing a U-clip surrounding the fastener elements.

The fastener shown in FIGURES 1–3 consists of two pressure sealing element chain halves or rows 5 and 6 mounted on neoprene-proofed synthetic fabric tapes 3 and 4, and fitted into a lengthwise opening 14 of a container or air cushion wall 1 as indicated by the dotted lines. The free tape ends of both fastener sides are overlapped at points 10 and 11 and suitably secured together with adhesive and additional rivets 12 and 13.

One, 5, of the two chain halves has extensions 5a, 5b at both ends, past the other chain half 6 to receive the slider or clasp 7 free from the shorter chain half 6. End stops 8 and 9 at both ends prevent over-running of the slider, which is shown in the closed position on extension 5a where it cannot prevent an opening of the chain at point 16, under a lateral stress, as is the case when the slider embraces chain halves of equal lengths. Since there is also no clasp or other securing means at the other chain end 17, such a fastener will rip apart at both points 16 and 17 and consequently separate over its entire length, when subjected to a sufficient cross pull or lateral force.

To close the fastener after it has opened as just described, the slider 7 is simply moved along the chain half 5 to the other extension 5b, where it can engage the end of the shorter half 6 at point 17 in the manner usual with separating fasteners for subsequent meshing and full closure. The slider returns in this way again to its parking position at point 8 on extension 5a at the free end of the closed chain.

Such a fastener can also be opened manually, if so desired, by moving the slider in the opening direction and subsequently closed by a motion in the opposite direction like a conventional zipper. In order to let the automatic opening of the fastener chain take place only at the defined hoop stress along the container wall, two backing sheets or separating pads 15 and 19 are cemented to the under-side of the tape faces and across the widths of the fastener, and extend forward under the closed element chain to the lines marked A and B. These backing sheets are made of high elasticity neoprene, the stretch resistance of which can be suitably arranged for instance by an appropriate thickness or cross section to prevent the automatic opening at the points 16 and 17 below a predetermined internal container pressure or hoop stress.

The backing sheets serve at the same time as a sealing means for the open portions of the fastener between the chain ends at 16 and 17 and the overlapped element tapes at 10 and 11. A low pressure differential will force the pliable, backing sheets 15 and 19 into sealing contact against the under-side of the closed chain ends and the adjacent portions of the tapes, adhesive being omitted in these areas in order not to intefere with the opening or closing of the fastener.

FIGURES 4 and 5 show a second construction which differs from that of FIGURES 1–3 mainly in the means for determining the internal pressure at which the opening or "bursting" occurs and for sealing the ends of the fastener. In place of the two adhesively secured backing sheets 15, 19 there are two loose sheets 24, 25. The sheets are secured to the tapes by means of six press-stud fasteners 26, three for each tape. The sheets 24, 25 are flexible and elastic to enable them, under pressure within the container or cushion, to be deformed into sealing engagement with the tapes, including the walls of the groove formed at 27. Furthermore the elasticity enables the tapes to separate and the joint ends to open under a predetermined internal pressure or hoop stress. The feature that the sheets are secured by press-stud fasteners—other readily releasable means may be used—enables the sheets to be interchanged with other sheets having different degrees of elasticity.

As an alternative to reliance on the elasticity of the sheets to permit opening of the fastener, the press-stud fasteners or other releasable means may be arranged to release the sheets under a predetermined load.

Other releasable means for holding the fastener ends closed may also be used. For example the end elements may be held by a U-clip fitted over them, as shown in FIGURE 8 the clip being arranged to fracture or open out under load. Alternatively the end elements may be tied together (e.g. by wire) or a tie may be passed through eyelets in the two pieces of flexible material, the tie in either case breaking under load. In some cases the resistance to opening of the fastener ends themselves may be sufficient in these cases as well as in those in which U-clips or ties are employed it may be desirable to replace the sheets 15, 19, 24, 25 by folded pleats or gussets beneath the two end portions of the fastener, the pleats or gussets beneath the two end portions of the fastener, the pleats or gussets uniting the two pieces of flexible material and providing at least some measure of seal for the ends of the fastener when closed while permitting separation of the fastener ends.

The fastener elements are arranged as shown in FIGURES 6 and 7. Each element 30 has a head 34, and the heads of opposed elements are arranged to engage behind each other. The ends of the elements away from the heads are held within a fold of the tape 3 or 4 by a clasp 32 which is crimped around them.

The invention is not restricted to fasteners of the kind having separate fastener elements. It may be applied to continuous plastic fasteners of the kind having a bead or beads on one part fitting into a groove or grooves in the other part.

I claim:
1. A sliding clasp continuous fastener comprising:
  (a) two rows of fastener elements along edge portions of two pieces of flexible sheet material to be joined, each element having a head portion arranged to be engageable in holding relation with the heads of a pair of elements in the opposite row,
  (b) a clasp movable along the rows of elements and operable on movement in one direction to effect engagement of the elements and on movement in the opposite direction to effect disengagement of the elements, and
  (c) at each end of the fastener an extension of one of the rows of elements beyond the other row to receive the clasp free of the other row.

2. A fastener as claimed in claim 1 in which the pieces of flexible material are joined at the ends of the fastener by means permitting limited separation of the pieces.

3. A fastener as claimed in claim 1 in which the pieces of flexible material are joined at the ends of the fastener by separable means.

4. A fastener as claimed in claim 1 in which the pieces of flexible material are joined at the ends of the fastener by elastic sections which are readily detachable for interchange of said sections with others.

5. A fastener as claimed in claim 1 in which the extension consists of additional fastener elements.

6. A fastener as claimed in claim 1 in which each fastener element has a shank with the head attached to one end thereof and in which there is, for each element, an outer element of U-shape which holds between its arms a fold of the flexible material around the end of the shank of the element remote from the head.

7. A sliding clasp continuous fastener comprising:
  (a) two continuous fastener elements along edge portions of two pieces of flexible material to be joined, said elements being releasably engageable in interfitting holding relation along their length, and at least one element being resilient to permit engagement and disengagement,
  (b) a clasp movable along the elements and operable on movement in one direction to effect engagement of the elements and on movement in the opposite direction to effect disengagement of the elements, and
  (c) at each end of the fastener an extension of one of the fastener elements beyond the other to receive the clasp free of the other row.

8. A fastener as claimed in claim 1 in which the pieces of flexible material are jointed at the ends of the fastener by rupturable means.

References Cited by the Examiner
UNITED STATES PATENTS 2,114,747 4/1938 Murphy _____ 24—205
2,632,933 3/1953 Firing _____ 24—205.11

FOREIGN PATENTS 558,341 6/1958 Canada.

BERNARD A. GELAK, *Primary Examiner.*